US006738456B2

United States Patent
Wrona et al.

(10) Patent No.: US 6,738,456 B2
(45) Date of Patent: May 18, 2004

(54) SCHOOL OBSERVATION AND SUPERVISORY SYSTEM

(75) Inventors: John C. Wrona, Tonawanda, NY (US); Reed S. Wilson, Buffalo, NY (US)

(73) Assignee: Ronco Communications and Electronics, Inc., Tonawanda, NY (US)

( * ) Notice: Subject to any disclaimer, the term of this patent is extended or adjusted under 35 U.S.C. 154(b) by 0 days.

(21) Appl. No.: 10/008,120

(22) Filed: Nov. 5, 2001

(65) Prior Publication Data

US 2003/0048879 A1 Mar. 13, 2003

Related U.S. Application Data (60) Provisional application No. 60/318,166, filed on Sep. 7, 2001.

(51) Int. Cl.[7] .............................................. H04M 11/04
(52) U.S. Cl. ............................ 379/37; 379/45; 379/133
(58) Field of Search ................................ 379/133, 134, 379/32.01, 32.05, 32.02, 198, 249, 37, 88.25, 67.1, 45, 38, 93.24, 265.01

(56) References Cited

U.S. PATENT DOCUMENTS

| | | | |
|---|---|---|---|
| 6,072,860 A | * | 6/2000 | Kek et al. ................. 389/88.25 |
| 6,246,752 B1 | | 6/2001 | Bscheider et al. |
| 6,249,570 B1 | | 6/2001 | Glowny et al. |
| 6,249,571 B1 | | 6/2001 | Rojas |
| 6,266,397 B1 | * | 7/2001 | Stoner ........................... 379/45 |
| 6,427,001 B1 | * | 7/2002 | Contractor et al. ........... 379/45 |

FOREIGN PATENT DOCUMENTS

JP        353116714 A    * 10/1978    ............ H04M/3/24

OTHER PUBLICATIONS

Xtend Communications Corp, Telephony Solutions Designed For People; xtend; Powerpoint presentation; Best available date Jan. 17, 2001.

Xtend Communications Corp, (9–1–1 Alert) Public Safety Telephony Solutions; PS/ALI–911 Caller Locator Solutions; Marketing collateral; Best Available Date Sep. 17, 2002.

* cited by examiner

*Primary Examiner*—Melur Ramakrishnaiah
(74) *Attorney, Agent, or Firm*—Basch & Nickerson LLP; Duane C. Basch (57) ABSTRACT

The present invention is a method and apparatus for a PBX-based observation and supervisory system to be used by a facility for monitoring, reporting, and notification of certain telephone calls. The system comprises a PBX system having a plurality of telephone sets operatively connected thereto, and a computer platform interconnected with, and operating as an interface to, the PBX system, wherein the computer platform includes preprogrammed software to record, trace, monitor, supplement or acknowledge call placed thereon. The system further includes software and processes for monitoring status and diagnosing problems therein.

19 Claims, 7 Drawing Sheets

SCHOOL OBSERVATION AND SUPERVISORY SYSTEM

CROSS REFERENCE

The following related application is hereby incorporated by reference for its teachings:

"SCHOOL OBSERVATION AND SUPERVISORY SYSTEM," John C. Wrona et al., U.S. Provisional Application No. 60/318,166, filed Sep. 7, 2001. (Dkt. No. RGE-1P)

This invention relates generally to emergency preparedness in schools and other institutional or business settings, and more particularly to a system that is seamlessly integrated with existing or new private branch exchange (PBX) systems to provide various monitoring and notification features related to emergency calls routed through the PBX system.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY OF THE INVENTION

The need for security in schools is at an all time high. Designers of communication infrastructures are beginning to re-focus on enhancements with practical functionality. The present invention leverages many years of integration experience, and an understanding of the K-12 school marketplace into a product offering referred to as the School Observation & Supervisory (SOS) System.

The present invention, referred to herein as a School Observation & Supervisory (SOS) system is a system that is seamlessly integrated with existing or new private branch exchange (PBX) hardware to provide various monitoring and notification features related to emergency calls routed through the PBX system. The SOS system preferably interfaces to one or more of a number of PBX systems and combines their unique messaging features (message advertisements) into a single environment. It adds functionality not intrinsically available within the core feature set of any particular PBX component, and provides a converged access point for recall and playback of incidents.

Heretofore, a number of patents and publications have disclosed related features, generally associated with public emergency 9-1-1 services, the relevant portions of which may be briefly summarized as follows:

U.S. Pat. No. 6,246,752 discloses a system and method for monitoring a telephone switching environment. The system combines recording of telephone call information from at least two sources (e.g., computer telephony integration (CTI) and station message detail recording (SMDR)) to form a call record. While there appears to be a teaching of robust call monitoring and recording in a PBX system, there does not appear to be a teaching related to the automated recording based upon a trigger signal generated by a 9-1-1 or another emergency call.

U.S. Pat. No. 6,249,570 teaches a similar system, where a master call record is compiled by the system based upon information provided by the PBX. Moreover, the master call record may include a link or pointer to a data file containing the actual call recording.

U.S. Pat. No. 6,249,571 describes a telephone management system. In particular, the system disclosed is an integrated software system that manages a telephone system, including voicemail and 9-1-1 emergency systems. A key feature of the system is that it integrates, and updates, various databases that may be employed in a telephone management system, so as to operate as if there were only a single database.

In accordance with the present invention, there is provided a facility observation and supervisory system to be used by a facility for monitoring, reporting, and notification of certain telephone calls, comprising: a PBX system having a plurality of telephone sets operatively connected thereto; and a computer platform interconnected with, and operating as an interface to, the PBX system, wherein the computer platform includes preprogrammed software to record, on-demand, calls passing through the PBX system, and trace calls, wherein enablement of the call tracing is completed in an undetected manner.

In accordance with another aspect of the present invention, there is provided an emergency call notification system for communicating emergency call information to notification recipients, comprising: a PBX system; a controller operating in accordance with preprogrammed software, said controller being interconnected to said PBX system via a private communication bridge, said bridge obtaining identifying information from the PBX system regarding at least an emergency call; said controller further storing and operating a location database suitable for identifying, based upon the identifying information from the PBX system, the location of the telephone placing the emergency call; said controller further storing and operating a notification database, the database including data corresponding to at least one notification recipient, the database being accessible by the controller software to provide notification recipient data to facilitate controller contact with at least one notification recipient and providing emergency call identifying information as well as telephone location information.

In accordance with yet another aspect of the present invention, there is provided a school observation and supervisory system, comprising: a PBX system; a controller, interconnected to a back plane of said PBX system to monitor any emergency calls passing through the PBX system, wherein the controller executes at least one of the functions selected from the group consisting of:

a call record function, wherein the system shall record a call from any such configured telephone set on the PBX, a malicious call trace function, wherein the system shall initiate a trace of an incoming call from any telephone line connected to the PBX, an internal 9-1-1 notification function, wherein; the system shall provide, for in-building notification of any extension dialing an emergency number, (a) notification (audible and visual), in multiple locations via multiple mediums, of an emergency call having been placed, (b) exact station location that dialed the emergency call, identified by extension number, user name, time of call and trunk line accessed to dial call, and (c) a call log; and where upon termination of a call, the system provides access to review the data collected.

One aspect of the invention is based on the observation of problems with conventional PBX and telephone company equipment—the lack of information that is available or provided regarding emergency calls placed from or received by private telephone equipment such as PBXs. One aspect of the present invention is based on the discovery of a technique that alleviates these problems by providing a communications bridge and intelligent processing of data available from conventional PBX systems. Moreover, such a system preferably operates seamlessly and in a "stealth" mode so as to not only avoid interference with emergency calls but also to avoid detection of the presence of monitoring, recording or tracing operations. This technique may be implemented, for example, by using a conventional computer platform that is interfaced to a PBX in order to provide a communications link between the PBX and the computer platform. A machine implementing the invention can include pre-existing or new PBX equipment, by using available communication and control ports. Hence, the cost to implement such a system may be minimized (only incremental cost of the SOS system), as would be the time required to implement The techniques described herein are advantageous because they provide an inexpensive solution to emergency call monitoring, tracing and they provide additional information to emergency personnel via conventional PBX equipment. Aspects of the present invention make it unnecessary for schools and other institutional and business facilities to purchase and install dedicated emergency reporting systems. The present invention can be adapted to any of a number of existing PBX systems, enabling the expansion of system functionality to include one or more of the features described here; particularly including monitoring and notification of emergency 9-1-1 calls placed from a PBX system and self diagnostics. The techniques of the invention are advantageous because they permit improved monitoring and notification of emergency situations, particularly in schools. As a result of the invention, the functionality of existing and newly installed PBX systems can be greatly expanded.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

A "CDR Packet" refers to a call data record packet that is used to characterize details about a particular call placed through the PBX system. The School Observation & Supervisory (SOS) system shall be an integrated function of the specified PBX, and shall be used by the school District system administrator for monitoring, reporting, and notification of the following features within the PBX:

Stealth Call Recording;
Stealth Ambient Call Record
Stealth Compartment Monitoring and Recording
Stealth Call Trace
Post-Event Call Trace
911 Annunciation with detailed location information
911 Origination Confirmation
Emergency Status Update
Automatic Email generation when services are used
Automatic telephonic call origination with acknowledgement
Real-time, ongoing Disarrangement diagnostics
Catastrophic SOS system failure annunciation; and
E-mail & Internet/WEB integration.

The School Observation & Supervisory (SOS) system is a message marshalling system that, in one embodiment, enhances the intrinsic feature set of the Nortel Meridian® PBXs and the Rauland Telecenter® public address systems. By leveraging functionality of both systems with a vision for enhanced safety in the schools and other institutions, the resulting system offers a completely new feature set not possible without the SOS system. Although described with respect to particular hardware, such as the Nortel and Rauland systems, other PBXs and public address systems may also be employed in the integration of SOS functionality and the present embodiment is not intended to be limited to the hardware embodiment described herein. Similarly, other applications for the SOS system include federal, state and local municipal office buildings, healthcare facilities, hospitality and commercial enterprises, etc.

The SOS system is preferably provided and installed on an industry standard personal computer (PC) platform such as an Intel Pentium® Server operating under Microsoft Windows® 2000 and having dual ported video display adapters. Approved operating system shall be either UNIX or Microsoft® Windows®. All components within the PC shall be non-proprietary and be widely available. The system shall be independent and not tax or interfere with any intrinsic 9-1-1 notifications or security functionality of existing systems. In one embodiment the system shall include a plurality of data paths, including multiple voice paths and at least two data interface paths with the associated PBX system.

Figure 1:
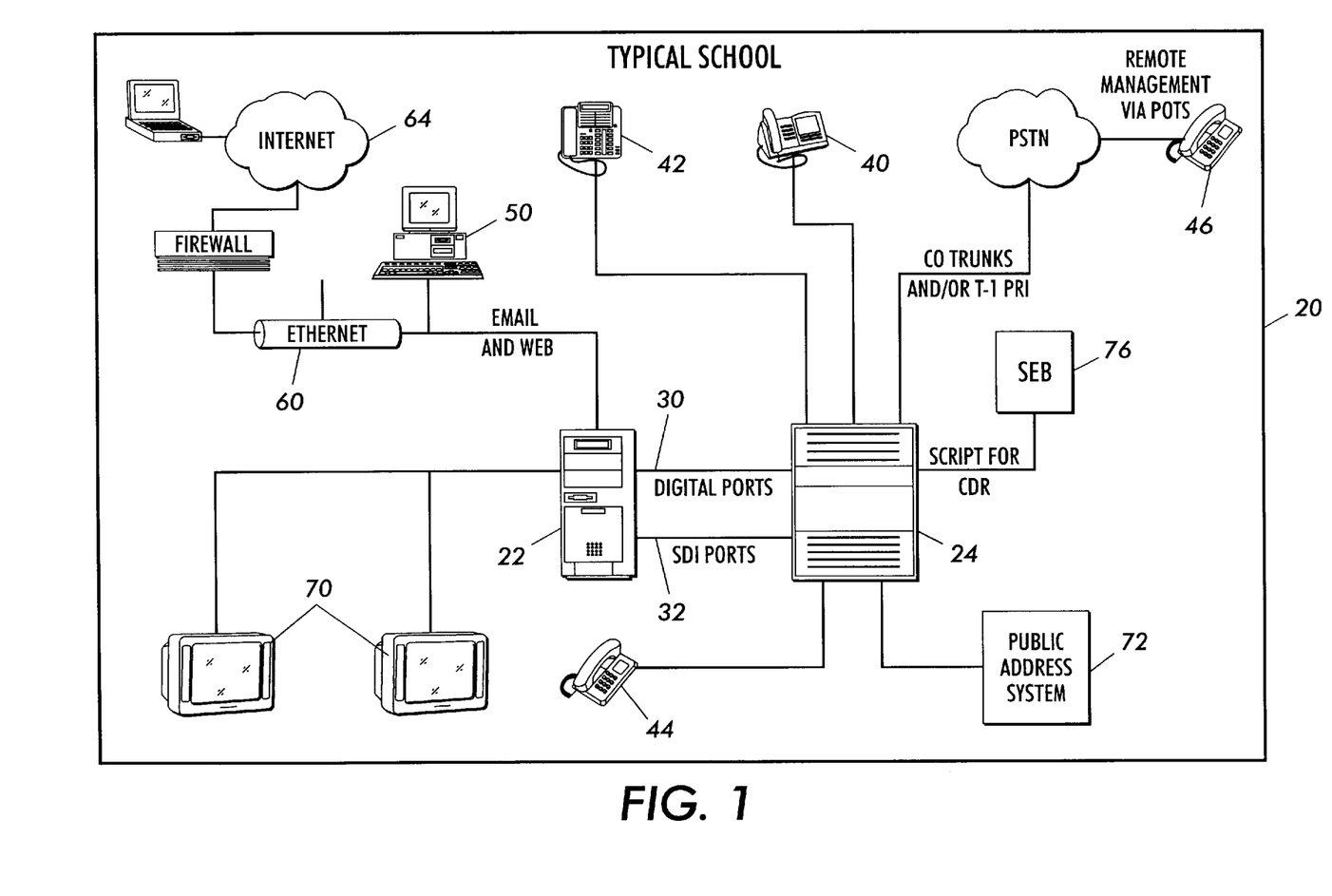
FIG. 1 is a schematic block diagram illustrating various components of an embodiment of the present invention.

Referring to FIG. 1, which shows an in-school embodiment 20 of the SOS System, the SOS system preferably includes the various functions as will be described in detail below. The SOS system, as operated by the SOS controller 22, includes controller 22 interfaced to a PBX system 24 such as a Nortel Meridian system or its equivalent. Components integrated or associated with the controller 22 include: a radio-frequency (RF) modulator to drive remote industry standard televisions; a digital PBX integration board(s); an analog telephone trunk integration board(s); dry contact relay integration boards; and an uninterruptible power supply (UPS). The interface between the controller 22 and PBX system 24 is accomplished via digital ports 30 and SDI ports 32. For example, when a feature button is depressed on a multi-line, digital phone 40, 42 connected to the PBX system (or a feature code entered on an analog set 44), a digital signal is generated on the PBX system 24 and is communicated to SOS controller 22.

In one embodiment, the media server 22 interfaces to the PBX via Intel® digital port emulation circuits specific to the Nortel® 2616 style telephones, and RS-232 serial ports. Interfaces to the public address system are via Intel Dialogic® FXS trunk emulation circuits and bi-directional dry relay contact closures. Interface to the remote displays (televisions) are via the second video port, modulated into the RF band and distributed via industry standard cable or closed circuit television infrastructures.

Although depicted with a single PBX system 24, the present invention further contemplates a multi-building embodiment, for example a school campus with multiple buildings, where the PBX system may include a central controller 22 that is interconnected with a plurality of remote stations. In such an embodiment, the SOS controller would be associated with the central PBX system. Alternatively, in situations where there are multiple buildings and multiple PBX systems servicing those buildings, it may be possible to utilize a plurality of SOS controllers, wherein some of the functionality thereof is coordinated through a common device or network (not shown).

Figure 2:
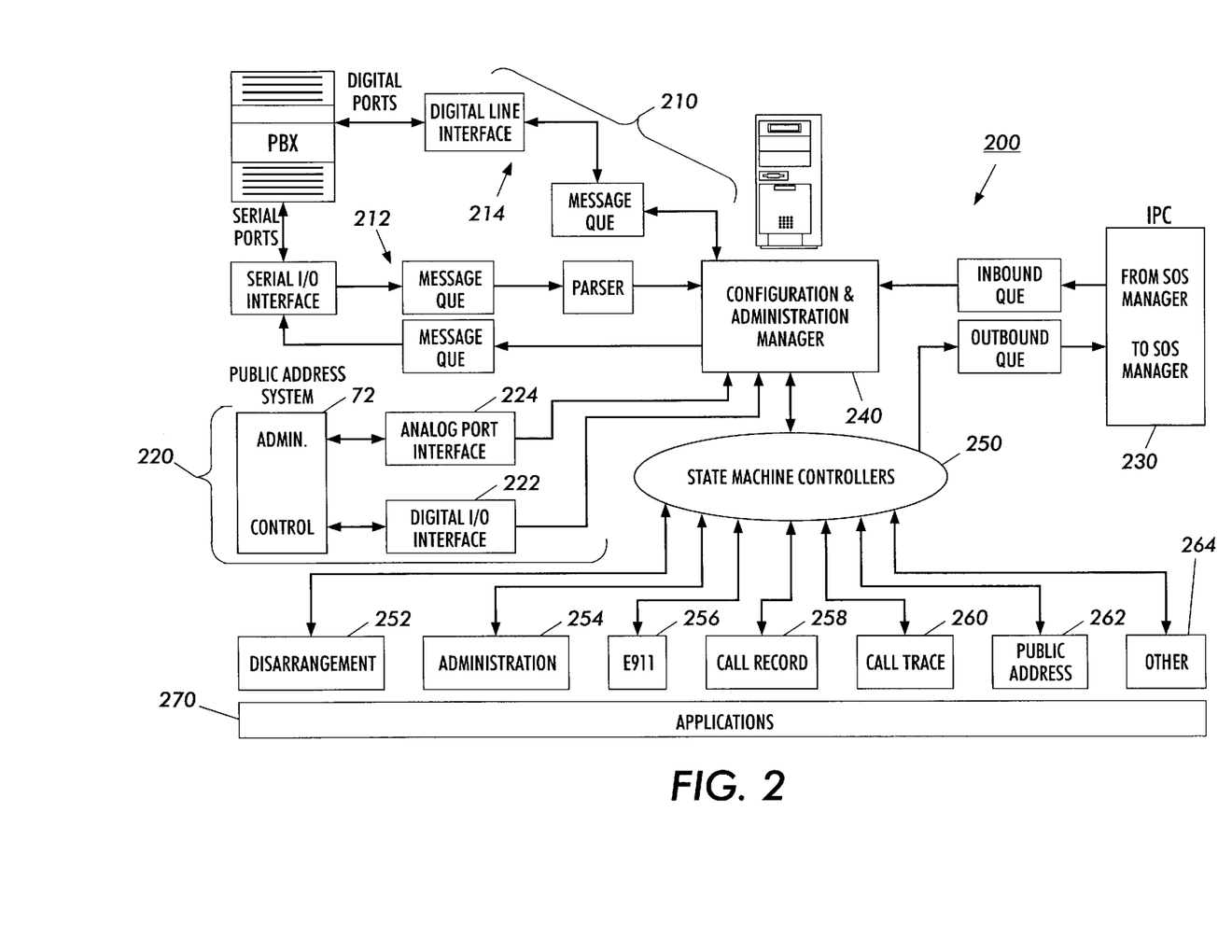
FIG. 2 is a general layout of the Control Module software components employed in an SOS controller in accordance with an aspect of the present invention.
Figure 3:
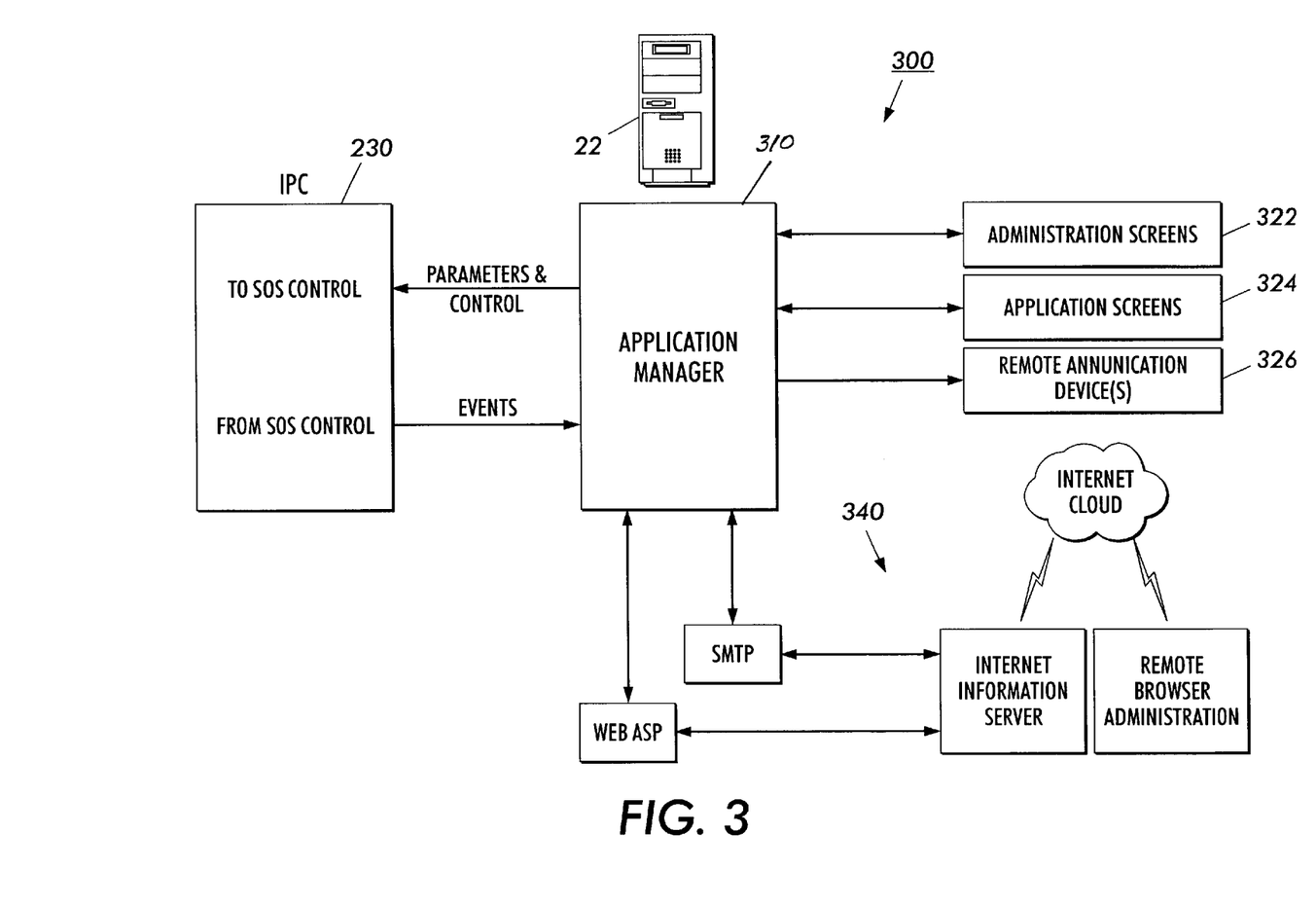
FIG. 3 is a general layout of the Manager Module software components employed in an SOS controller in accordance with an aspect of the present invention.

The SOS controller preferably operates on a Pentium computer having sufficient system resources to support the previously described features. In one embodiment, the SOS controller operates under the control of pre-programmed software, wherein the software is comprised of two functional components as indicted in FIGS. 2 and 3. Referring briefly to FIGS. 2 and 3, there is depicted a general layout of the SOS software architecture, where functionality is divided into SOS Control Module (FIG. 2) and SOS Manager Module (FIG. 3). Moreover, in order to assure that the two blocks are able to communicate between one another, a communication interface or IPC is present to facilitate intra-SOS module communications.

Referring to FIGS. 2 and 3, aspects of the software designed to control the SOS system are depicted. Software is partitioned into two separately compiled and executed processes. The first, referred to as SOS_CONTROL (FIG. 2), is the software closest to the hardware and manages all interactions with the PBX and the public address system. The second, referred to as SOS_MANAGER (FIG. 3), is the graphical software that the system administrator interacts with, the remote displays are managed by, and Internet services such as e-mail and World Wide Web are integrated. The two modules communicate bi-directionally with each other using a buffer-queued inter-process communication technique (IPC) represented by reference numeral 230 in the Figures. The IPC assures that real-time events are not lost.

In terms of software layers, Windows 2000 is the base level. The multi-threaded, multi-tasking nature of this operating system is essential in handling the natural concurrency of the PBX and public address system. Drivers from Intel Dialogic® manage the API to SOS_CONTROL, and tight coupling to the SOS_MANAGER is facilitated by the IPC software.

In general, the SOS CONTROL is a multi-threaded application with the following functions allocated to separate threads:

Inbound Administration Via plain ordinary telephone service (POTS)—uses Dual Tone Multi Frequency (DTMF) commands entered by the remote administrator to command the SOS system. The SOS system responds with a combination of pre-recorded spoken phrases, unique tone sequences (motifs) and text to speech synthesis;

Outbound Notification Via POTS—when commanded by an event response profile, the system places an outgoing call to a recipient. Interaction with the recipient uses the same techniques as inbound administration (above);

Disarrangement Tests—this is a set of reactive and proactive functions that monitor the availability and operational status of interfaces. The action taken as a result of a disarrangement is determined by an event response profile;

Background Processing and IPC Message Management—this thread queues and distributes configuration parameters from SOS_MANAGER and queues and distributes events and data to the SOS_MANAGER;

Communications Port Manager—this thread process all characters and strings exchanged between the PBX's serial ports and SOS. Services such as 911 events, call trace, call detail recording and PBX maintenance commands are managed;

Man Machine Interface (MMI)—this is a console orientated, text based interactive environment explicitly for developer and technician support functions. It is a command line interpreter front end with expression parsing capability. Services such as status, and internal testing are managed by this thread;

Call Record—for each instance of call record a thread is started. This is seen from a modular perspective where system expansion is realized by successively adding digital ports between the PBX and the SOS system to accommodate growth of concurrent recording sessions; and School Public Address Interface—in this thread all control of the zoned public address system is managed. Through a loop start trunk, loop current and DTMF, in-band signaling is used to command the system from SOS_CONTROL. Dry contact closures (both in and out) of the public address system convey all other necessary control that is not possible thought the telephonic interface.

As depicted in FIG. 2, the SOS Control Module 200 includes a PBX interface 210 and a public address interface 220. The PBX interface may include both serial (212) and digital line (214) interfaces, with message queues and possibly parsing functionality as indicated. Similarly, the interface to the public address system may include both a digital (222) and/or an analog (224) interface. As noted above, the Control Module software includes an IPC 230 to interface with the SOS Manager Module depicted in FIG. 3. Overall control of the SOS system is facilitated via the Configuration and Administration Manager 240, which in turn utilizes a plurality of state machine controllers 250 to control the various features described herein. In particular, there are controllers, in the form of threads as described above, for disarrangement diagnostics (252), administration (254) for both inbound and outbound calls, Emergency 9-1-1 (256), call record (258), call trace (260), public address (262) and other optional features (264). Each of the various features may further rely on particular applications available to the SOS as represented by applications block 270.

As depicted in FIG. 3, the SOS Manager Module 300 includes an overall application manager block 310 that is interfaced to IPC 230 for communication with the Control Module 200. Particular applications managed by the software of block 310 include the user interface in the form of administration screens (322), application screens (324) (users) as well as remote annunciation devices (326). Also included in the Manager Module is interface functionality so as to enable the system to be accessed and to send information via a network (Internet) interface 340.

The Manager Module is preferably a single threaded application that is event based. It is focused on the graphic presentation of SOS configuration and event responses to the administrator and the remote television displays. Internet integration is supported through simple message transport protocol (SMTP) for e-mail and active server pages (ASP) for the World Wide Web. This application is the primary interface to the SOS administrator. Typical Windows® forms, and common dialog controls make up the look and feel of the interface.

SOS uses Windows® memory mapping as the technique of sharing data across the separate processes (Control and Manager). Implemented as two one-way channels, one for control to manager and the other for manager to control, it is organized into binary and ASCII configuration structures and arrays of string buffers. A circular buffered queuing concept is used to pass message strings between the two processes. To handle issues with manipulation of input and output pointers across processes the Windows® MUTEX application programming interface (API) functions are used to lock and control access to processes as necessary.

Turning next to the specific features and functions of the present invention, the SOS system enables, for example, a Stealth Call Recording function represented by thread 258 in FIG. 2. This feature is typically used to record any call (internal or external via a trunk). The main purpose of the feature is to record incoming trunk calls since it attaches call detail record (CDR) information to the recording. Although it is typical to have internal (within facility) CDR turned off, should internal CDR be enabled SOS will use these records also.

From a user's perspective, a digital telephone set is provided with a key marked "Record" to initiate the Stealth Call Record function. From a PBX perspective this button is programmed as a hot line—no hold conference feature that directly dials a directory number associated with the SOS systems' first available recording port. At any time the user is engaged in a call the record button may be pressed. Without any audible sound discernable to the call participants, the PBX sets up a conference to the SOS system. Note that is also possible for an analog telephone to record calls; this however requires the user to execute a hook flash, dial a special code, and hook flash again, which may result in a temporary interruption of the voice path with audible clicking sounds to the caller (therefore not considered stealth).

During a Stealth Call Record event, the SOS_CONTROL process has several threads executing. One thread is managing the reception of PBX call detail records (CDR) and saving them in a database. A thread for each recording port is also executing and waiting for an inbound call. Upon detecting a call record request, it is immediately answered. All information regarding the originating caller (the one that pressed the "Record" key) is captured and written to the database. A digital signal processing (DSP) resource is allocated within the system and initialized. A filename is generated using the calling port, the calling directory number and the system time. The file is opened and recording of both or all parties to the call begins. A message is placed into the IPC queue informing the SOS_MANAGER of the current status. All of this preferably happens within milliseconds of the user pressing the record button. Furthermore, recording continues up to the time that a disconnect status is communicated from the PBX to the SOS system. Upon detection of a disconnect the recording is halted and the file closed. A search of the database begins and looks for any and all CDR records that are associated with the just terminated call. The CDR information and the name of the recorded file are collected into a "call record event" and the information pertaining to the call is written to the database. Another message is placed into the IPC queue indicating to SOS_MANAGER that the call record event is ready for processing.

SOS_MANAGER is always reading the IPC queue and reacting to the message content. A call record session generates two messages within the system. The first message is to indicate call record is currently in progress, the second indicates completion of the call. In the case of the first message being processed, the recording port is marked graphically as busy and annotated with the calling party info. This is for administration purposes only. Upon processing the second message the event response profile database is read. Subsequently, any of the following actions may take place.

1) If configured, an e-mail message will be generated containing the content of the call record event, with either no reference to the recording, a URL to the recording, or the recording attached. The recipient, method and time of delivery are determined by the configuration parameters specific to Call Record event response configuration. When the SOS system hands-off the e-mail for delivery, it is queued to the Microsoft® Internet Information Server's SMTP service for standard e-mail delivery procedures. When the recipient receives the e-mail, in the case of the URL option, and it is selected, an access over the world-wide web (WWW) to the SOS server is initiated using the recipient's browser. The SOS ASP functions challenge the credentials of the attempted WEB client access with a dialog box, and either allows or blocks the access based upon well-known authentication and authorization techniques. In all cases the interaction with the user is saved into the access database log. If access is granted the WEB client has the option to stream the audio content or download it. These options are saved in a USER profile only accessible to the SOS administrator.

2) If configured, a POTS telephone call will be generated containing a subset of the call record event content. The recipient, method and time of delivery are determined by the parameters specific to Call Record Telephonic Delivery configuration. When the recipient receives the call a message is played informing the recipient that this call is from the SOS system at the configured location. The recipient is then asked to enter their authorization code to continue to hear the remainder of the message. Upon successful authorization, the recipient hears the header portion of the event record. Depending upon the access rights assigned to the recipient by the system administrator, the recipient may or may not be able to hear the recording of the call itself. The interaction with the user is saved into the access database log.

3) If configured by the administrator, accounts can be created that allow access to the event database through the World Wide Web via standard web browsers. Using server side ASP scripting, and based upon the accounts privileges any event processed by the SOS system are available via this access method.

For all features of the SOS system this concept of e-mail, telephonic, and web notification and history access may be applied. This action sequence is referred to as the "Standard SOS Event Response" as the term may be used herein. It is further noted that the software algorithms used to implement the Call Record function are germane and enable other SOS features as will be further described below.

In implementing the Stealth Call Recording function, the SOS controller is programmed, in conjunction with the PBX system to record a call from any multi-line digital set on the PBX. In one particular embodiment, the SOS system audibly records and stores the entire two-way conversation as an industry standard wave file (e.g., Microsoft Multimedia . WAV Sound File Format file (.wav file)) accessible by a system administrator or others with permitted access to the SOS system. Upon termination of the recorded call, the SOS controller may further include functionality to automatically copy the .wav file from the hard drive to a read-only CD-ROM disk located in the CD-ROM drive. In addition the SOS controller receives a stream of data pertaining to the call from the PBX system, thereby enabling it to mark and log the following information in a recorded packet (e.g., using a standard Call Detail Record (CDR) format) with a stamp to include:

i. Day, Month, Year ii. Time of day iii. Extension and party name (if available) initializing "RECORD" feature iv. Calling line identification, if provided by telephone company (Telco)

v. Telco trunk line vi. Length of call in seconds

As described above, various methods may be employed to access the recorded call information and the associated digital recording .wav file. In one embodiment, the file may be accessed on a local computer 50 networked to the SOS controller 22, where the information is displayed via an industry-standard, WEB browser for full multimedia playback of recorded conversation and display of the recorded data packet. Alternatively, the recorded information, including the CDR data may be replayed through any authorized telephone, internal (40, 42, 44) or external (46) to the PBX. Access to the data would be via a voice-menu system, the hierarchy of which may be similar to known voice-menu systems. Numeric information from the data packet such as the trunk number and extension number shall be communicated via a spoken phrase. While it may be appreciated that a real-time speech synthesis system may be employed to communicate the numeric information, it is also contemplated that the system include a series of pre-recorded numeric or other required phrases, and that the system simply concatenate such phrases to generate the required "speech." Lastly, the SOS system may be able to automatically generate and forward, via local network 60 and/or Internet channel 64, an electronic mail (e-mail) message containing the CDR packet data and in one embodiment an attachment (.wav file) including the recorded conversation to pre-defined recipients maintained within a distribution list. Another embodiment would have the (e-mail) message contain a standard World Wide Web URL link to the .wav file, whereas the .wav file remains on the SOS system and is made accessible via a password challenge to the recipient of the (e-mail) message on demand via a mouse click.

A second function of the SOS system is referred to as Stealth Ambient Recording. In general, this is similar to Stealth Call Recording, with the exception of how the recording is initiated. If the digital telephone set has speakerphone capability, simply pressing the Record button without any other action places a hotline call to the SOS recording port. As described in Call Record, the SOS system automatically answers the call and begins recording the in-office conversation as may be received by the speakerphone. In this way, an administrator, staff person or other may record conversations via the telephone system. The user stops recording by pressing the RLS key on the telephone. The SOS stops recording and begins the configured event response as previously described.

Another function enabled by the pre-programmed SOS controller is Malicious Call Tracing (MCT), where the SOS system provides for tracing a call from any telephone set on the PBX. As in the call record situation, the call tracing function is initiated by the user initializing the "TRACE" feature on any telephone set. From a PBX perspective this button is programmed as the intrinsic trace function. At any time the user is engaged in a call and the button is pressed, the standard Meridian 1 malicious call trace action takes place. Note that it is also possible for an analog telephone to trace calls. This, however, requires a hook flash and code entry with the likely temporary interruption of the voice path.

Upon detection of a MCT request, the PBX shall initiate call detail recording to mark the call in the SOS system to be accessible by School District System Administrator or other permitted personnel. The MCT call record is captured by the SOS system, parsed and stored in a database. An additional database containing the actual carrier assigned directory number (in the case of copper trunks) or T1 channel number (in the case of a T1 transport) is searched and a correlation to the PBX trunk is made. The administrator is responsible to keep the trunk database current. As in Call Record, an event response database is read. The subsequent actions are similar to the call record actions with regard to the Standard SOS Event Response. Upon termination of the traced call, the SOS system shall mark and log the following information in a CDR packet with a stamp to include:

i. Day, Month, Year ii. Time of day iii. Extension and party name initializing "TRACE" feature iv. Calling line identification, if provided by Telco v. Telco trunk line Again, the SOS controller is also programmed to, upon termination of a call, provide post-trace access methods including: (a) a WEB browser for display of the CDR packet data, (b) a telephone interface wherein numeric information is communicated via a "spoken" phrase; and (c) an e-mail message containing the CDR packet data to recipients on a distribution list. As previously described, for direct access (web and telephone), and possibly even for e-mail, a security process would be employed to prevent unauthorized access to the CDR data and to log all accesses and access attempts.

Another function enabled by the SOS system is referred to as Post-Event Call Trace where, from any phone in the PBX, it is possible to trace a call with the same action resulting as in Stealth Call Trace described previously. The primary difference is that the request or trigger for the trace may be delayed up to the time that the CDR database is flushed. The database is periodically flushed in order to manage data storage and to reduce disk space usage within the system. Accordingly, after such a time period, the CDR data is no longer available.

The feature operates as a result of a user notifying the administrator of the desire to trace a previous received (or originated) phone call with a PBX extension. The minimum information the administrator needs is the directory number of the PBX phone that received the call. It is optional to specify a time range in order to assist in identifying the call. Through the SOS_MANAGER interface the administrator causes the CDR database to be searched with a resulting report generated. The report, and/or actual call details, can then be made available to an e-mail recipient through the web interface.

Another feature of the SOS system, referred to as Stealth Compartment Monitoring and Recording or Crisis Monitoring, leverages some of the intrinsic features of the Rauland Telecenter systems. The purpose of the Stealth Compartment Monitoring and Recording feature is to clandestinely listen in to a classroom from any public switched telephone network (PSTN) telephone. An example would be equivalent to the FBI placing a bug into a hostage location. To enable the feature, the SOS administrator deliberately sets up an account specifically for inbound public switched telephone network (PSTN) monitoring access. The administrator provides the public telephone number, the account number and the password to the appointed agency. When the agency calls into the SOS system they are challenged for the account number and password.

Upon successful authentication, the caller is greeted with a menu of choices. One such choice is to directly enter a room number. After entering the room number the caller is connected to the room in a listen only reception mode. The room audio is thereby transmitted to the caller. There is no evidence to anyone within the room that the room is being monitored. By pressing a DTMF key a recording session begins. It is possible that the administrator can act as an "operator" in the context that the caller and the operator are conferenced together. Hence, the control of the SOS system can be carried out by the operator without the caller having to do anything. This is referred to as the "Assisted Monitor" mode.

Aspects of the management of this call type are explained in the Call Record section as represented by thread 258 in FIG. 2. A thread specific to remote monitoring may be executed, and is generally illustrated by "other" thread 264. Upon detection of an incoming call on a specific port the call is answered. After presenting a spoken banner message and a motif, the caller is prompted for an account number and password. Whether successful or not, all interaction is logged into a database. As is well-known in the art of computer authorization and access, there are configurable threshold parameters to allow repeating the login process up to a limited number of tries. If successful the caller is granted access and the main menu is played. If unsuccessful, the caller is disconnected. The caller may call back and attempt another logon session. If still unsuccessful, and it is the "nth" attempt, all future access is blocked until the administrator intervenes. The Standard SOS Event Response is triggered by all actions.

In the on-line menu, one of the selections asks the caller to enter a room number to be monitored. After accepting the DTMF digits for the room, the SOS system begins the access of the public address system. First, the alert tone needs to be disabled as this access is to be stealth. This is carried out by the SOS system closing a relay contact that is interfaced to the public address system. Then, SOS seizes a Foreign Exchange Office (FXO) type trunk to the public address system. Upon detecting a dial tone, the necessary DTMF digits are transmitted to the public address system. A full duplex audio path is connected between the compartment and the caller into the SOS system. To prevent the compartment from hearing any audio transmitted by the caller, the digital signal processor (DSP) resource connecting the two ports is configured as simplex—passing only audio from the compartment to the SOS caller.

At any time the administrator may call into the system for the purpose of controlling the monitor sessions. Here a DSP resource is allocated to engage a conference to the connected caller. Through DTMF, or via a WEB browser, the administrator can control the entire session. Note that while there may be a full duplex audio connection between the SOS administrator and the SOS caller, the compartment audio connection remains listen only.

Another important feature of the SOS system is 911 Annunciation with Detailed Location Information. Use of such a feature is no different than intrinsic 9-1-1 dialing on the PBX system. In response to the detection of 9-1-1 being dialed, or a preprogrammed emergency button being pushed, the SOS system provides significant functionality. This is similar to E911 in the context of providing location information. However, the SOS system also provides audio/video notification (enunciation and advertisement) of the emergency call over broadband CATV infrastructures terminating in standard televisions or monitors. It is anticipated that there is a TV at every building egress location, so that emergency personal may seek facility access and be informed of the location upon entry to the facility. Both video and audio is carried to each location.

A database within the SOS system contains multiple fields of textual data specific to identifying a precise location within a facility(ies). All directory numbers within the facility have a unique record. The system administrator manages this database. Also contemplated is the display of a graphic map with a flashing icon indicating a precise location within the facility(ies).

In the quiescent state, the remote enunciation displays 70 are blank, or displaying an administrator defined background. A thread, represented as thread 256 in FIG. 2, constantly monitors and parses data streams from the PBX's serial port that is configured to deliver 911 system activity. Upon detection of such events they are captured, data relative to the events is written into a database, and the event trigger the following actions:

1) the remote displays 70 (FIG. 1) switch from the quiescent state into the enunciation state. There is an area on the screen that is configured to display, in large, clear fonts, the location information of the 911 caller. In another area is the space that the graphic is displayed. An audible signal, preferably stored in an industry standard ".WAV" file, is played through a speaker associated with the display. Another thread begins executing and manages the recording of the 911 conversation. Furthermore, the Standard SOS Event Response is triggered.

2) the SOS system can process as may simultaneous calls that the PBX can deliver. Even if there are no 911 trunks available SOS will still process the events. If the standard On Site Notification set was not acknowledged, that state is archived in the database. The administrator's interaction with SOS is the only method of removing location enunciation from the remote displays.

3) on a limited basis (non-simultaneously) the conversation may be recorded as in the feature of Call Record.

A related feature, referred to herein as 911 Origination Confirmation, performs all the actions of the 911 Annunciation With Detailed Location Information feature, with enhancements delivered by the school public address systems. In particular, the feature is configurable on a per compartment basis to provide a combination of tones, motifs, and spoken words to the public address speaker in the compartment that was detected as calling 911. It is also possible to marshal public address zones and/or all-call to provide a similar action. For example, it is typical in a school PA system to have several zones of paging—all of the $1^{st}$ floor, all of the second floor, etc. When using the paging system a zone is first selected then the page is made. It is possible and desirable to perhaps select the $1^{st}$ floor and the $3^{rd}$ floor—but nowhere else. It is more typical to select an "all call" where all the zones are selected. This is the intent of the marshaling.

It is further contemplated that the Origination Confirmation enhancement would be beneficial, for example, if a 9-1-1 call has been placed, and either prematurely terminated or if the person placing the call was unable to remain on the line (e.g., attending to the emergency situation in the classroom). Then, the SOS system may generate an audible notification message that is transmitted to the location where the call was placed via the public address system. Such a feature may use the telephone/PBX system "page" feature to send a prerecorded message back to the room acknowledging that an emergency call has been placed.

Lastly, another feature of the SOS system shall be Emergency Status Update (ESU). When schools go into a so called "lock down," there are a series of actions that take place for teachers to marshal their students and typically lock themselves in the classroom with shades drawn and directed to a specific location in the classroom. An example of a reason to do this could be a roving person with a weapon. Teachers are trained to recognize an audible motif and associate a specific action with that motif. One such motif may communicate the need for a teacher to dial a specific directory number on classroom phone.

The administrator has the ability to record an announcement into the SOS system. After the recording is made the SOS system broadcasts a selected motif across the school's public address system in an all-call mode. All pre-selected staff and faculty recognize this motif as "dial NNN now". Both simultaneously, and asynchronously, calls will be placed throughout the school to a specific directory number. An Automatic Call Distribution (ACD) queue is deployed to manage the inbound termination of calls to directory number NNN. The "agents" of the ACD queue are up to 8 SOS Emergency Update threads executing and expecting incoming calls. SOS immediately answers, prompts the caller for a password (optional), plays the just recorded announcement, and immediately disconnects the call. The SOS thread for the just-completed call is now ready for the next call. In a preferred embodiment, regardless of the number of callers to the directory number NNN, each caller dials the number and simply waits for the announcement. If all SOS threads are busy delivering the announcement to other callers, the current caller hears a ring tone.

Depending on the administration of the ESU feature, there could be a single motif and expected response, or there could be several specific to an anticipated safety condition. In each scenario, the occupants dial a preprogrammed ESU extension in response to the audible motif, or possibly a visual cue, hear the ESU message and are automatically disconnected by the SOS System so as to process more occupants' calls.

The SOS System preferably has some or all associated hardware and software equipped to allow the system's multimedia mailbox to receive messages from, and send messages to, other locations and be accessible through a standard browser interface.

In addition to the features described above, the system preferably:
   a. complies with industry standards to smoothly integrate with existing customer information technology and telecom environments;
   b. displays Caller name and Calling Line ID in the message header, and messages can be retrieved in any order;
   c. allows an Administrator to reply to and forward messages using standard e-mail commands.

In such a system standard protocols are preferably employed to maintain compatibility with existing and newer hardware, such protocols include, but are not limited to, IMAP for WEB-based message access protocols, Simple Mail Transport Protocol (SMPT) and Post office Protocol (POP).

One of the primary features enabled by the coordination of software blocks in FIG. 2 is the Automatic Disarrangement Diagnostics feature. Periodic exercise or testing of system components and features may be programmable to be either random and/or scheduled. For example, self-test routines within the SOS controller may execute at various times and the failure of such routines, if not correctable, would be reported to a system administrator and/or to an off-site maintenance organization.

In order to assure that the SOS system is ready and available, the concept of disarrangement detection is a major feature of the present invention. Managed by a separate thread is the disarrangement process 252 (FIG. 2). It provides both reactive and proactive management of failures and commanded diagnostic tests. Moreover, as in the base Call Record feature, the concept of Standard SOS Response is applicable to disarrangement responses.

One aspect of the disarrangement diagnostics is Reactive Disarrangement; in this group the disarrangement process is constantly checking for failures of interface points to the PBX and the public address system. In the case of the PBX, the serial ports are monitored for hardware interruptions and character corruption. The digital interface ports are monitored for carrier coherency and disruption. Various inter-process (SOS_CONTROL & SOS_MANAGER) and inter-thread semaphores are exchanged and checked for plausibility.

Another aspect of the disarrangement diagnostics is Proactive Disarrangement, where the disarrangement process is executing deliberate tests with expected outcomes. Triggering periods and rates are determined from configuration parameters that may or may not be altered by the system administrator. In the case of the PBX, the serial ports are tested for full delivery of message content from the PBX. This is accomplished by commanding the maintenance overlays of the PBX to execute a serial test. The serial signatures resulting from the test are compared to the expected result, and any difference flags a disarrangement error.

To test the physical digital ports of the PBX, the PBX programming specific to these ports, and the entire software system of SOS, the disarrangement thread for each call record port executes a call record session. Origination of the call is from the disarrangement outbound port. When commanded, a call is placed to a recording port. After detection of the automatic answer, the origination ports sends a series of DTMF tones out. They are presumably recorded by the recording port. The call is disconnected. The known file that was created on the disk is then opened and played back into a DSP resource. The DTMF digits are decoded and checked for an exact sequence as that of the recording phase. Any difference flags a disarrangement error.

The last aspect of the disarrangement diagnostics is Commanded Disarrangement Diagnostics. Here, all of the subroutines and processes that implement the above procedures are accessible from the console application thread.

Syntax of the console interpreter accepts functions and parameters that can call the intrinsic disarrangement procedures. More specifically, aspects of the code can be tested or status acquired. Things like internal variables that are out of the scope of the users can be queried. For instance, a disarrangement test that validates the call record capability is actually made up of several sub-tests where if any fail—the whole function is considered to be disarranged. That perspective is good enough to signal an alarm condition that requires service. From a service/developers perspective the console is used to execute the sub-tests and examine system variables to understand where the "higher level" test failed. Note that in SOS_MANAGER (FIG. 4, 428) is a field that these commands can be entered.

Another feature of the SOS system is that of Catastrophic SOS System Failure Annunciation. In addition to the disarrangement software previously described, this feature implements an ability to detect and annunciate a loss of processing coherency or the complete failure of the SOS system. Implementation of the feature is preferably achieved by utilizing copper slugged electromechanical relays, or passive resistors and capacitors (RC).

Within the disarrangement thread, the SOS_CONTROL software is creating a dual pulse-width modulated signal stream directed to digital hardware output points. These points are connected to a slow to operate and a slow to release relay respectively. By adjusting the pulse timing with the physical reaction time of the slugged relays, the relays will be held in a constantly changing state from energized to de-energized to energized. However, but static due to physics of electromagnetism and copper, or the time constants of a RC circuit, the relays will remain static (always closed). Interconnecting the relay contacts in an appropriate manor, through a resistor, a single dry contact closure, held statically in the prescribed resistance mode is developed through this technique. Any failure of the SOS system that results in either of the two digital output points remaining statically in any state, or out of prescribed timing, will cause the relays to change their quiescent state.

This resistance loop is extended to a remote external device through field wiring of a single pair. The entire circuit is considered a supervisory loop. At the remote location, any change in the resistance, is an indication that either there is a disarrangement in the supervisory loop, or the SOS system has a fatal failure and is no longer dependable or available. Accordingly, the SOS system is self-monitoring relative to a catastrophic failure.

Furthermore, the site event buffer 76 of FIG. 1, is accessed via modem and dialup capability within the PBX system, wherein the SOS communications port interconnects directly to the PBX modem. That way remote monitoring and/or diagnostic routines may be run by the off-site vendor to determine SOS system performance status and to assist in isolation of SOS system and/or PBX system faults.

Figure 4:
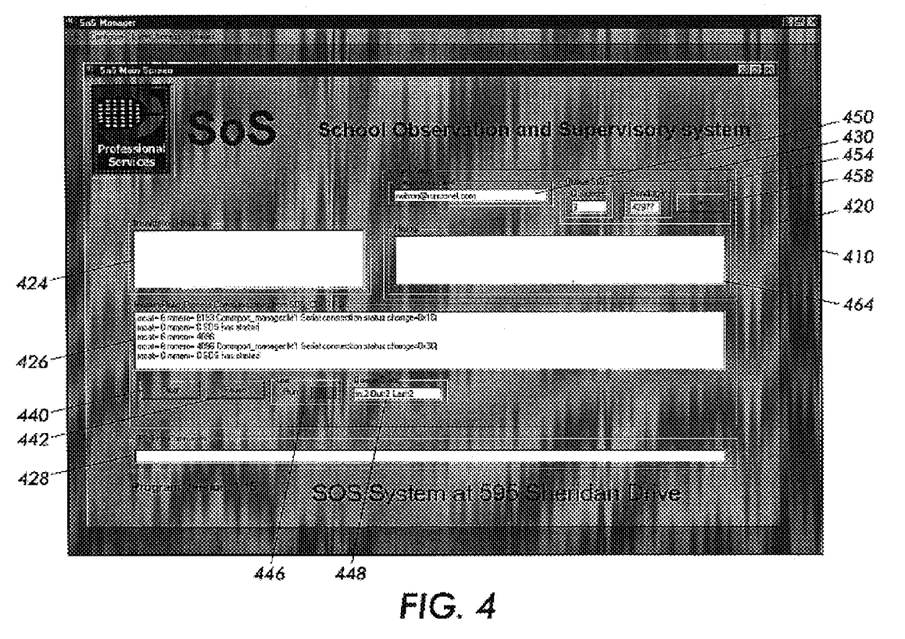
FIGS. 4–7 are illustrative examples of user-interface screens in accordance with aspects of the present invention.

Having described a hardware embodiment for the SOS system, and the operation of the various features enabled by a system in accordance with the present invention, attention is now directed to FIGS. 4–7, where various aspects of the SOS system interface are illustrated. Each of the FIGS. 4–7 illustrates a user interface screen 410 having a window therein. Referring specifically to FIG. 4, window 420 is the SOS system main administration window, and includes regions therein for initialization messages 424, Inbound communications 426, IPC Test Commands 428 and e-mail watch 430. More specifically, region 424 provides a real-time display of software initialization messages. Region 426, depicting inter-process communications from the SOS_CONTROL software, displays a history of IPC message content. The regions also includes buttons 440 and 442, as well as a "Life" indicator region 446 that shows heart beat communications between SOS_CONTROL and SOS_MANAGER. Also in region 426 is a Queue Stats indicator 448 that displays the current position of the input and output pointers in the circular queue.

Continuing with FIG. 4, IPC Test Commands region 428 of the SOS system main administration window will provide information relating to the command line interface to SOS_CONTROL. Further depicted in window 420 is e-mail watch region 430, containing a display of the current SOS status e-mail recipient, field 450. In region 454, the IPC Queue Stats field shows the number of queued messages, the number of seconds until sending automatically as well as a send button 458 for forcing all messaged in the queue to be sent immediately. In the lower portion of region 430, there is a History window 464 that would be used to display disarrangement states and remedies. Overall, window 420 of FIG. 4 may be employed by a system administrator to monitor the state of the SOS system and execute test commands.

Figure 5:
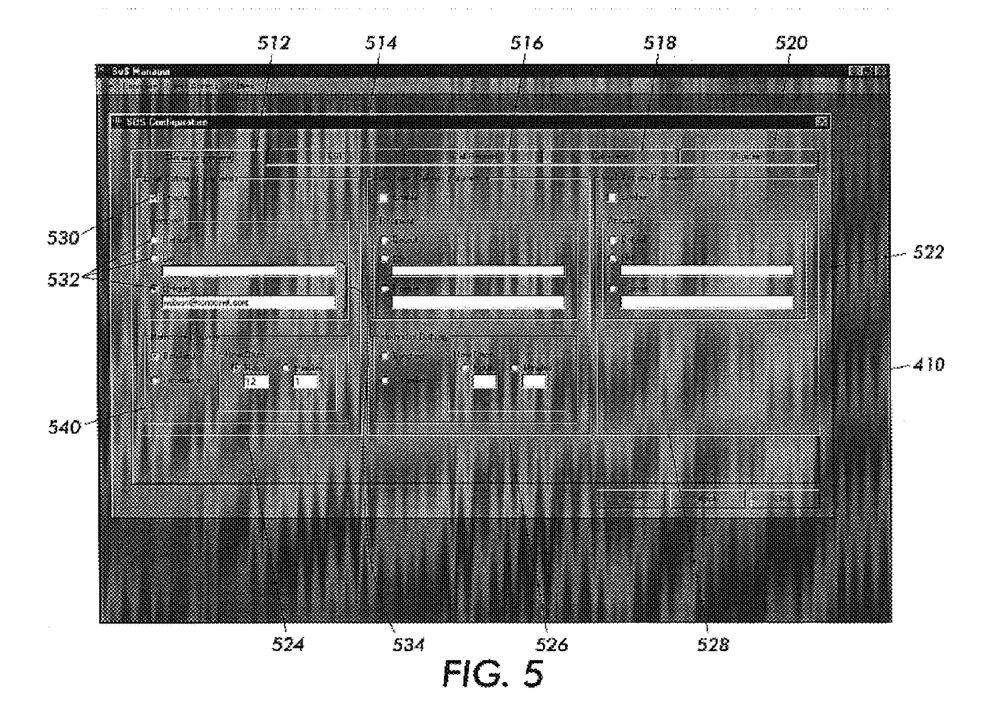

Turning next to FIG. 5, display on screen 410 is the SOS system configuration window 522, where each of the plurality of system features and their configurations settings are displayed by a user selecting tabs 512, 514, 516, 518 or 520. As depicted in the Disarrangement configuration (tab 512), there are three regions for user input, e-mail delivery parameters in region 524, telephonic delivery parameters in region 526 and web access parameters in region 528. More specifically, region 524 includes a checkbox 530 to indicate whether e-mail notification is to be sent, along with radio buttons 532 and fields 534 to determine who is to be notified by e-mail of the disarrangement tests and system status. At the bottom of e-mail region 524, in region 540, the user may specify the delivery method via additional radio buttons and time fields.

In a similar manner, selections and data entry may be made into the telephonic and web access regions, 526 and 528, respectively. Hence, the Disarrangement tab and associated fields, buttons, etc. may be employed by the system administrator to control those who are permitted access to disarrangement testing information. It will be appreciated that similar functionality is supplied in the other tabs, for example, control of those who are notified of Emergency 911 calls, and the method of notification (tab 514).

Figure 6:
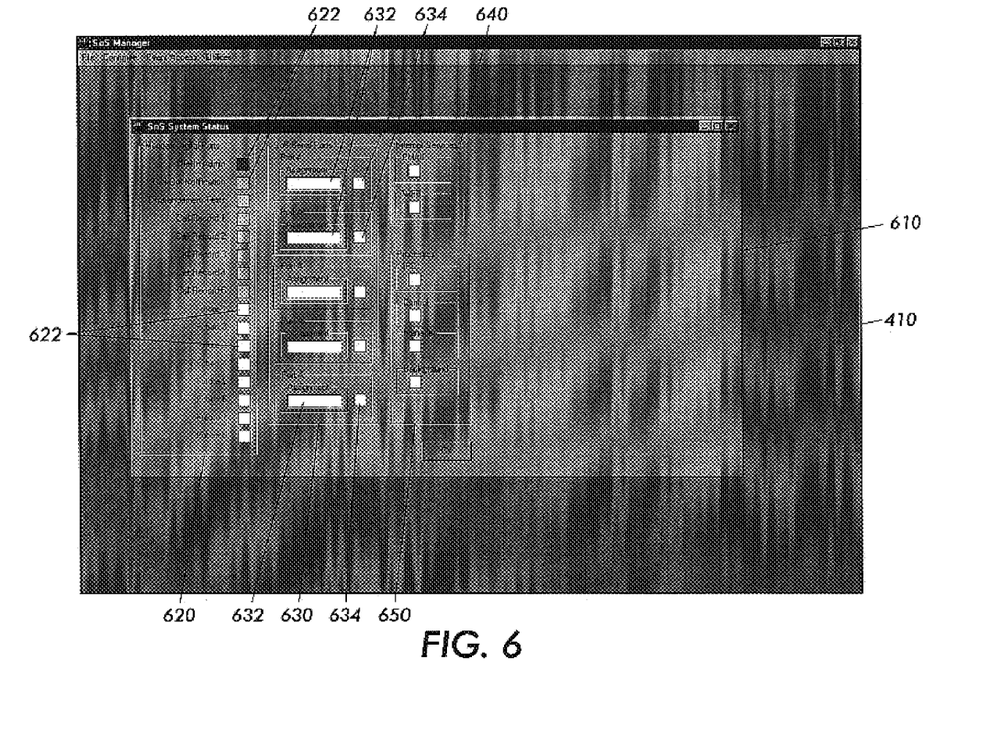

Referring to FIG. 6, depicted therein is a SOS system status window 610 that displays, for a system administrator, the status of the system in real time. In region 620 the system displays a plurality of status indicators 622, where the color or shading of the indicator is indicative of the status of that particular component. For example, a "red" indicator for Dial-In Admin indicates that the port is out of service, and a "yellow" indicator for Call Record 1 indicates that the port is available for service, and a "green" indicator indicates that the port is in service or being used. Those indicators that are grayed-out (e.g., Future 4) indicate reserve indicators that do not have assigned functionality at the time of this screen shot. The SOS Ports displayed in region 630 show, in associated fields 632 and indicators 634, the status of the serial communication ports to the PBX. Similarly, regions 640 and 650 respectively show the status of e-mail and software processes within the SOS system.

Figure 7:
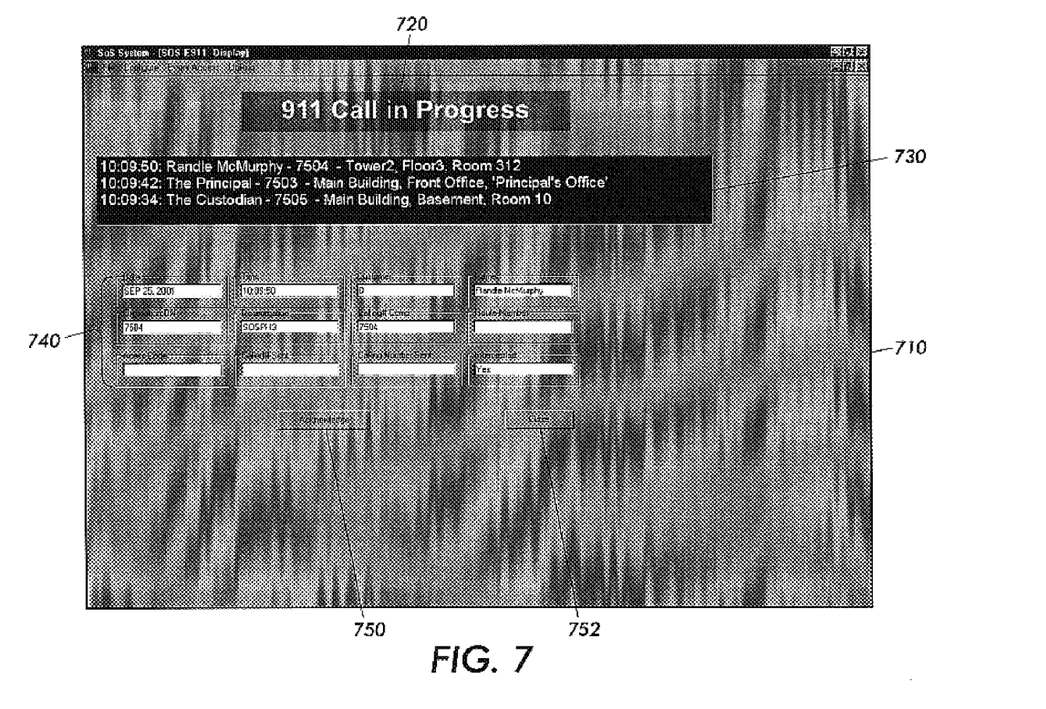

Turning, lastly, to the window 710 in FIG. 7, the window is one which may be displayed on a monitor or television display near an entrance to the facility being monitored by th4 SOS system. In particular, the display screen 710 will indicate the nature of the emergency situation, region 720, and the location of the emergency. For example, the Emergency 911 call is displayed in region 720. Beneath region 720 is a listing of the system calls, including the top call, as well as the caller (Randle McMurphy), the phone extension (7504) and the location (Tower2, Floor3, Room 312) so that information as to the location of the caller is immediately provided to emergency and security personnel entering the facility. In region 740, information pertaining to the PBX's call detail record is displayed, and buttons 750 and 752 may be used to acknowledge an audible alarm and to close the window.

In recapitulation, the present invention is a method and apparatus for a PBX-based observation and supervisory system to be used by a facility for monitoring, reporting, and notification of certain telephone calls. The system comprises a PBX system having a plurality of telephone sets operatively connected thereto, and a computer platform interconnected with, and operating as an interface to, the PBX system, wherein the computer platform includes preprogrammed software to record, trace, monitor, supplement or acknowledge call placed thereon. The system further includes software and processes for monitoring status and diagnosing problems therein.

It is, therefore, apparent that there has been provided, in accordance with the present invention, a method and apparatus for a telephone observation and supervisory system. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A facility observation and supervisory system to be used by a facility for monitoring, reporting, and notification of certain telephone calls, comprising:
    a PBX system having a plurality of telephone sets operatively connected thereto; and
    a computer platform interconnected with, and operating as an interface to, the PBX system, wherein the computer platform includes preprogrammed software to
    record, on-demand, calls passing through the PBX system, and
    trace calls, wherein enablement of the call tracing is completed in an undetected manner.

2. The system of claim 1, wherein the call recording software further enables date- and time-stamping all such recordings upon completion of the call, and recording of at least one other call characteristic.

3. The system of claim 1, wherein call tracing and recording features are triggered by separate user key signals from any one of the plurality of telephone sets.

4. The system of claim 1, wherein the computer platform further includes preprogrammed software to provide an internal station with notification that a 9-1-1 emergency call has been placed.

5. The system of claim 1, wherein the computer platform further includes preprogrammed software to provide automatic diagnostics and disarrangement for the performance of at least the computer platform, PBX interfaces and preprogrammed software.

6. The system of claim 1, wherein the computer platform further includes a network interface and preprogrammed software to enable the automated generation of network messages for distribution via a non-telephonic network interface.

7. The system of claim 6, wherein the network messages are e-mail messages.

8. The system of claim 6, wherein the network messages are comprised of both instantaneous messages and batched messages.

9. An emergency call notification system for communicating emergency call information to notification recipients, comprising:
    a PBX system;
    a controller operating in accordance with preprogrammed software, said controller being interconnected to said PBX system via a private communication bridge, said bridge obtaining identifying information from the PBX system regarding at least an emergency call;
    said controller further storing and operating a location database suitable for identifying, based upon the identifying information from the PBX system, the location of the telephone placing the emergency call;
    said controller further storing and operating a notification database, the database including data corresponding to at least one notification recipient, the database being accessible by the controller software to provide notification recipient data to facilitate controller contact with at least one notification recipient and providing emergency call identifying information as well as telephone location information via a display.

10. An school observation and supervisory system, comprising:
    a PBX system;
    a controller, interconnected to a back plane of said PBX system yet be non-blocking of any emergency calls passing through the PBX system, wherein the controller executes at least one of the functions selected from the group consisting of
    a call record function, wherein the system shall record a call from any telephone set on the PBX,
    a malicious call trace function, wherein the system shall initiate a trace of an incoming call from any telephone line connected to the PBX,
    an internal 9-1-1 notification function, wherein; the system shall provide, for in-building notification of any extension dialing an emergency number,
        (a) notification (audible and visual), in at least one location, of an emergency call having been placed,
        (b) exact station location that dialed the emergency call, identified by physical location, extension number, user name, time of call and trunk line accessed to dial call, and
        (c) a call log;
    where upon termination of a call, the system provides access to review the data collected.

11. The system of claim 10, wherein the access to review the data collected includes a browser interface for display of the call data.

12. The system of claim 10, wherein the access to review the data collected includes a telephone connection with a voice interface accessed via an authorized telephone number.

13. The system of claim 10, wherein the controller includes a notification database, the database including data corresponding to at least one notification recipient; and where the controller automatically generates an electronic message containing the CDR packet and sends the message to the at least one notification recipient via a contact method indicated in the database.

14. The system of claim 10, wherein the malicious call tracing and call recording features are triggered by separate user key signals from any one of the plurality of telephone sets.

15. The system of claim 10, wherein the computer platform further includes preprogrammed software to provide an internal station with notification that a 9-1-1 emergency call has been placed.

16. The system of claim 10, wherein the controller further includes memory for storing preprogrammed software to provide automatic diagnostics and disarrangement for the performance of at least the controller, PBX interfaces and preprogrammed software.

17. The system of claim 10, wherein the controller further includes a network interface and preprogrammed software further to enable the automated generation of network messages.

18. The system of claim 17, wherein the network messages are e-mail messages.

19. A facility observation and supervisory system to be used by a facility for monitoring, reporting, and notification of malicious telephone calls, comprising:
    a PBX system having a plurality of telephone sets operatively connected thereto; and
    a computer platform interconnected with, and operating as an interface to, the PBX system, wherein the computer platform includes preprogrammed software to record, on-demand, incoming calls passing through the PBX system, and
    selectively trace incoming calls, wherein enablement of the call tracing is completed in an undetected manner in response to a recipient-initiated request to trace the malicious call.

* * * * *